United States Patent [19]

Yang

[11] Patent Number: 4,946,135

[45] Date of Patent: Aug. 7, 1990

[54] STRUCTURE OF WATER TAP

[76] Inventor: Shun-Ching Yang, No. 202-20, Hou Pi Village, Jen Te Country, Tainan Hsien, Taiwan

[21] Appl. No.: 461,907

[22] Filed: Jan. 8, 1990

[51] Int. Cl.⁵ ............................................. F16K 31/528
[52] U.S. Cl. ....................................... 251/253; 74/57; 137/801; 251/229
[58] Field of Search ............... 74/56, 57, 543, 545, 74/548; 137/454.2, 454.5, 454.6, 446, 605, 606, 607, 636, 801; 251/229, 252, 253, 254, 255, 263, 298

[56] References Cited

U.S. PATENT DOCUMENTS

| | | | |
|---|---|---|---|
| 611,781 | 10/1898 | Field | 251/253 |
| 645,078 | 3/1900 | Field | 251/253 |
| 2,703,584 | 3/1955 | Mix | 251/252 |
| 2,756,775 | 7/1956 | Hyde | 137/607 |
| 2,866,478 | 12/1958 | Hyde | 137/607 |
| 3,037,520 | 6/1962 | Thomas | 251/252 |
| 3,190,309 | 6/1965 | Staat et al. | 137/454.6 |
| 3,369,566 | 2/1968 | Schmitt et al. | 137/607 |
| 3,455,335 | 7/1969 | Pekarek | 137/607 |
| 3,988,001 | 10/1976 | Kankaras | 251/251 |
| 4,273,292 | 6/1981 | Neula | 251/40 |

Primary Examiner—George L. Walton
Attorney, Agent, or Firm—Varndell Legal Group

[57] ABSTRACT

A water tap for water flow control, which utilizes a handle to control the movement of a valve element via a pressure rod, wherein the obliquely leftward or rightward moving range of the handle determines the spirally upward or downward moving range of the pressure rod to directly control the angle of deviation of the valve element so as to further control the quantity of water which flows out of the water tap.

8 Claims, 4 Drawing Sheets

STRUCTURE OF WATER TAP

BACKGROUND OF THE INVENTION

The present invention relates to a water tap for water flow control.

The conventional water tap is generally operated through turning or key button control. The common disadvantage of the turning type water taps is that excessive force which is applied during turning tends to damage the water cushion. In U.S. Pat. No. 4,804,163 and U.S. patent application Ser. No. 319,204 which was rejected, the present inventor disclosed two different key button operated water taps. Disadvantages of the key button type of water tap as disclosed in U.S. Pat. No. 4,804,163 are outlined hereinafter. (1) It has a complicated inner structure (approximately 25 internal parts are used). As a consequence, high frequency of parts damage can not be eliminated; (2) Flexible water flow control is not possible. In case of excessive down stroke of the key button rod, the key button rod must be moved to the upper limit position and pressed downward again to a suitable position; (3) The heavy striking force of water flow may force the key button rod to vibrate during maximum quantity of water discharging, to further cause the gang gear of the key button rod move away from its engaged position with the stop body; (4) If the water pressure reducing limit of the water pressure reducing mechanism is set at 5-lb, water keeps flowing therein when water pressure is below 5-lb, and the down stroke of the key button rod will become more difficult; and (5) If the water pressure reducing mechanism starts to operate when water pressure exceeds 5-lb, the quantity of water flow which flows out of the water pressure reducing mechanism is relatively reduced, and it will be difficult to obtain a big quantity of water flow at this moment. In the water tap disclosed in U.S. patent application Ser. No. 319,204, there is a valve gate mechanism which can efficiently eliminate the problem caused by water pressure. However, its complicated inner structure reduces its service life and increases its manufacturing cost.

The main object of the present invention is to provide a water tap which can efficiently eliminate the aforementioned problems.

An embodiment of the present invention includes a handle inserted in an oblique track on an upper cap and secured to a pressure rod in a cylindrical body. The displacement of the handle within the oblique track drives the pressure rod to move up and down to further control the angle of deviation of a valve element so as to control the quantity of water which flows out of the cylindrical body through a water discharging pipe.

Figure 1:
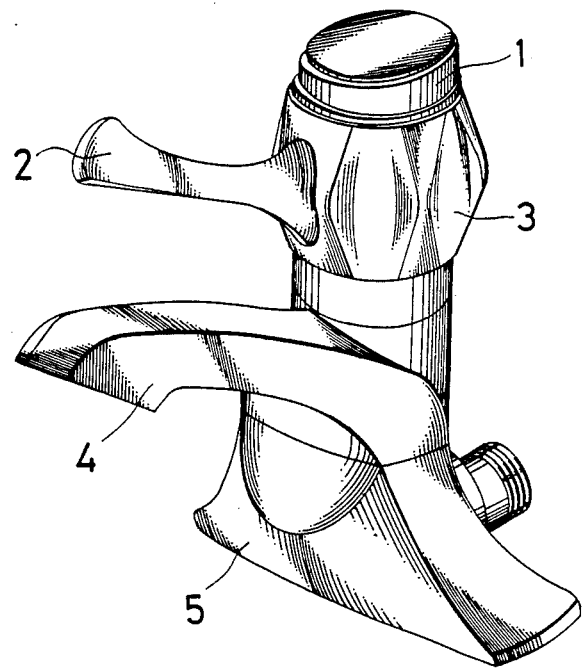
FIG. 1 is a perspective assembly view of a water tap embodying the present invention.

DETAILED DESCRIPTION OF THE PREFERRED EMBODIMENT:

Referring to FIG. 1, therein illustrated is an embodiment of water tape in accordance with the present invention and generally comprised of an upper cap 1, a handle 2, a socket 3, a cylindrical body 4, and a base 5.

Figure 2:
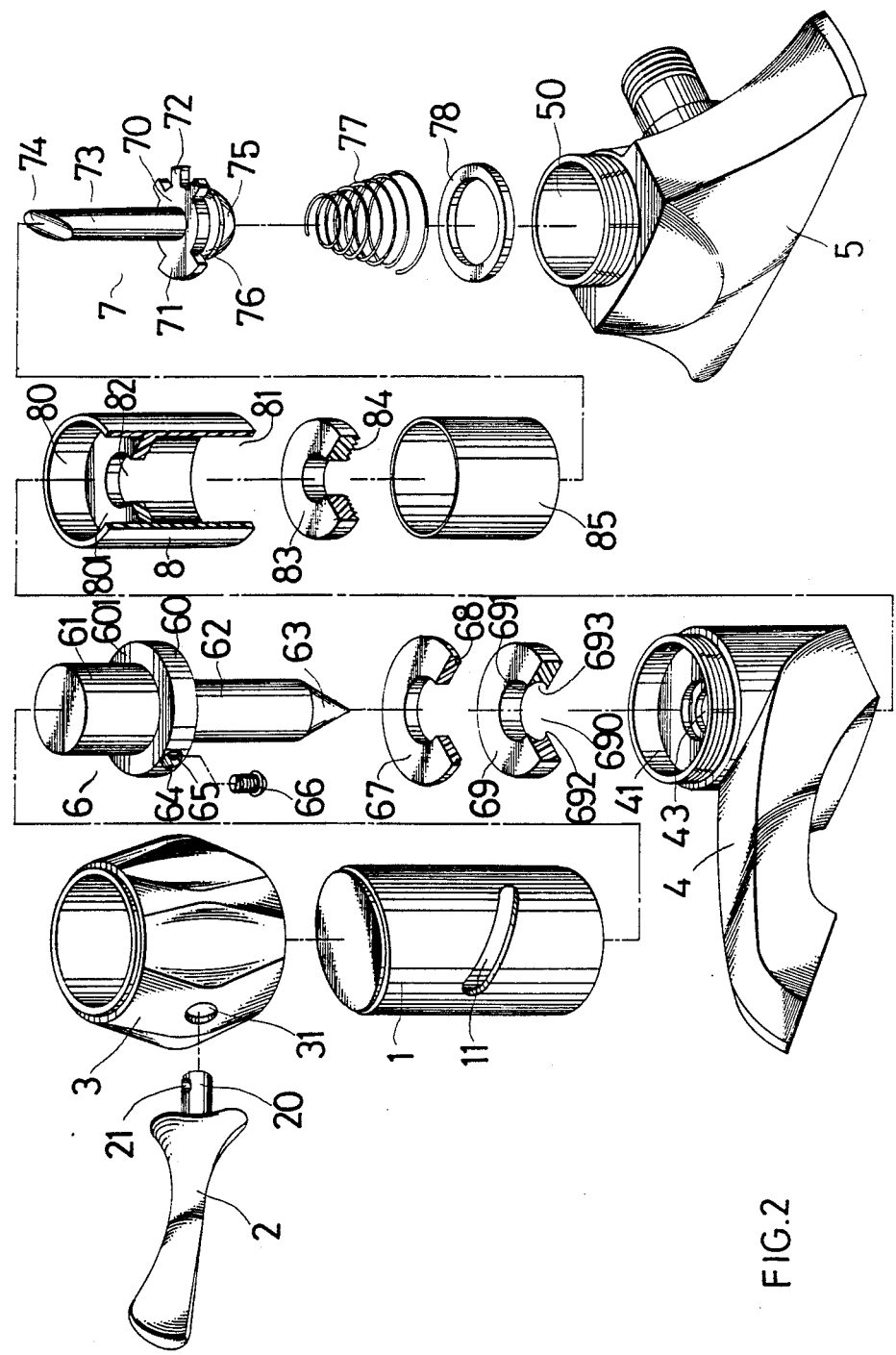
FIG. 2 is a perspective exploded view of the water tap of FIG. 1.
Figure 3:
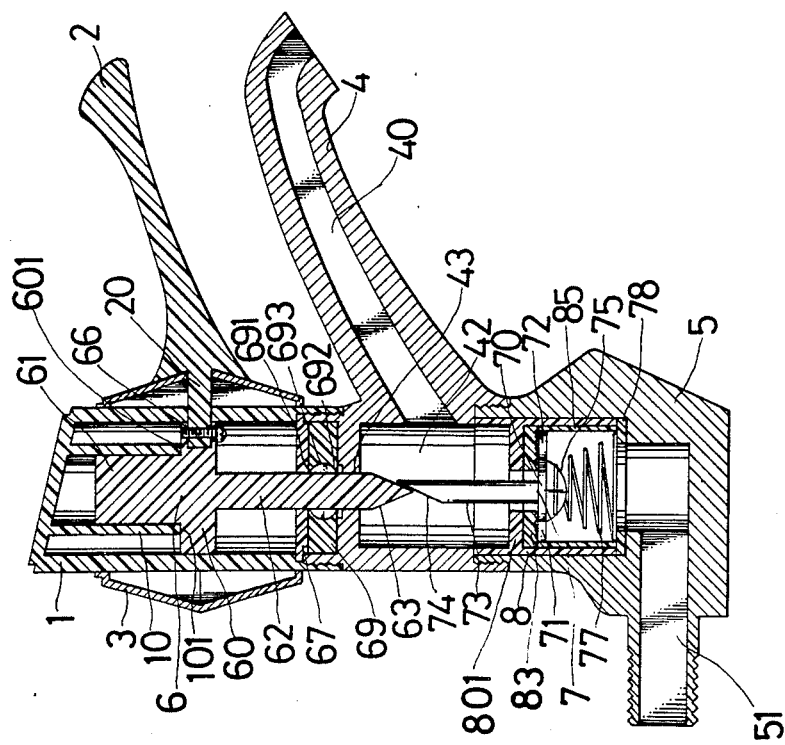
FIG. 3 is a left side sectional view of the water tap of FIG. 1.

Referring to FIGS. 2 and 3, the upper cap 1 comprises internally a hollow cylinder 10 into which a pressure rod 6 is inserted with its circular upper end 61, and an oblique track 11 piercing through the outer-wall thereof through which of a round rod 20 which extends from the bottom end of the handle 2 and inserted from a through-hole 31 on the socket 3 is inserted into a transverse hole 64 on a projecting collar 60 which is made on the pressure rod 6 permitting the bolt hole 21 thereof to aim at a vertical hole 65 on the bottom of such a projecting collar 60 (the vertical hole 65 is vertically communicating with the transverse hole 64) so that a screw 66 can be inserted therein to secure the handle 2 to the pressure rod 6. Therefore, when the handle 2 is turned to rotate leftward or rightward, the pressure rod 6 is carried to spirally move upward or downward. The cylindrical body 4 comprises an upper and a lower circular recess holes 41 and 42. A rubber seal ring 69 is inserted in the upper circular recess hole 41 and a plastic washer 67 is mounted on the top of such a rubber seal ring 69. The plastic washer 67 comprises a circular projection 68 at its bottom, which circular projection 68 has an outer diameter equal to the inner diameter of the upper circular recess hole 41 and slightly smaller than the outer diameter of the plastic washer 67 itself. When the upper cap 1 is screwing up with the cylindrical body 4, the revolving force will force the plastic washer 67 to firmly position in between the cylindrical body 4 and the upper cap 1, and the rubber seal ring 69 will be firmly retained in the upper circular recess hole 41. After the upper cap 1 is tightly secured to the cylindrical body 4, the cylindrical lower portion 62 of the pressure rod 6 is set in the lower circular recess hole 42 of the cylindrical body 4. A water discharge pipe 40 unitarily extends outward from the cylindrical body 4 through which water flows out. There is a valve element 7 and a valve seat 8 set in the cylindrical body and the base 5. The valve element 7 comprises a pillar 73 having a top slant face 74 which has an angle of inclination corresponding to the cone 63 of the bottom end of the pressure rod 6, a projecting collar 70 comprising a sector portion 71 at its one side and three teeth 72 opposite to its sector portion 71, and a cap-like bottom end 75 having a circular groove 76 thereon for the connection thereto of a conical spring 77. The valve seat 8 has generally a hollow body comprising a division board 801 defining therewith an upper circular recess 80 and a lower circular recess 81 which communicate with each other by means of a center hole 82. When the valve element 7 is set in the valve seat 8, its pillar 73 is inserted through the center hole 82. A ring shaped rubber water seal 83 is set between the division board 801 and the valve element 7. A metal ring 85 is set in the lower circular recess 81 of the valve seat 8 with its top edge in contact with the bottom surface of the rubber water seal 83 and its bottom edge in contact with the upper surface of another rubber washer 78 which is received in an upper trough 50 of the base 5. Because the rubber washer 78 has its top surface in contact with the bottom surface of the valve seat 8 as well as the metal ring 85, the rubber water seal 83 and the metal ring 85 are firmly positioned in the valve seat 8 when the cylindrical body 4 and the base 5 are tightly screwed up together.

Figure 4:
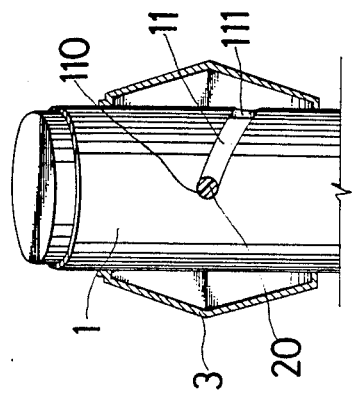
FIG. 4 is a partly front view of the embodiment of FIG. 1, illustrating the effective moving range of the handle in the oblique track of the upper cap.
Figure 7:
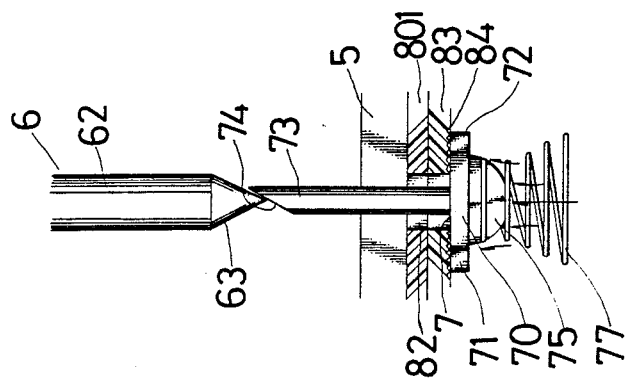
FIG. 7 is a schematic drawing, illustrating the connection of the pressure rod with the valve element when the valve element is at its vertical position.
Figure 6:
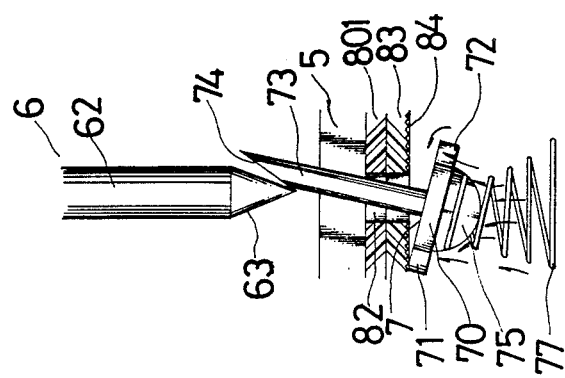
FIG. 6 is a schematic drawing, illustrating the connection of the pressure rod with the valve element when the valve element deviates from its vertical position.

Please refer to FIGS. 4, 6 and 7, and see FIGS. 2 and 3 again. The oblique track 11 of the upper cap 1 confines the moving range of the handle 2. As soon as the handle 2 is moved to the upper limit 110, the upper surface 601 of the projecting collar 60 of the pressure rod 6 becomes in contact with the bottom surface 101 of the hollow cylinder 10 of the upper cap 1, and the cone 63 of the pressure rod 6 is separated from the slant top face 74 of the valve element 7. When the handle 2 is gradually turned to move leftward, the pressure rod 6 is simultaneously turned to rotate downward. At the same time, the cone 63 of the pressure rod 6 is gradually moved to get in touch with the slant top face 74 of the valve element 7 (as shown in FIG. 6) such that the valve element 7 deviates from its position gradually. As soon as the handle 2 is moved to the lower limit 111 in the oblique track 11, the angle tilting of deviation of the valve element 7 reaches to its maximum range, permitting a maximum quantity of water which comes from an water inlet 51 in the base 5 to flow out of the cylindrical body 4 through the water discharging pipe 41.

Figure 5:
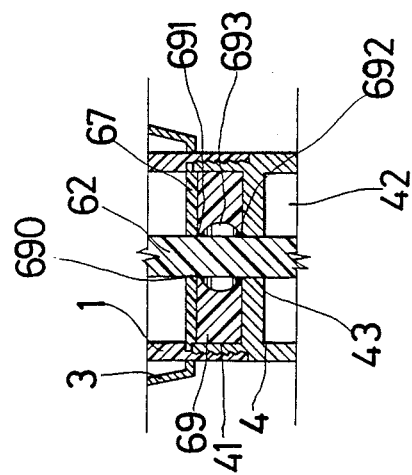
FIG. 5 is a schematic drawing, illustrating the connection of the pressure rod with the plastic washer and the rubber seal ring.

Please refer to FIG. 5 and see FIG. 2 again. The center hole 690 of the rubber seal ring 69 forms a curved opening 693 defining with the body of the rubber seal ring 69 an upper circle 691 and a bottom circle 692. Because the outer wall surface of the lower portion 62 of the pressure rod 6 is constantly retained by the upper circle 691 and the bottom circle 692 of the rubber seal ring 69, when the lower portion 62 of the pressure rod 6 is rotating upward or downward through the center hole 690 of the rubber seal ring 69, the rubber seal ring 69 rubs against the outer wall surface of the pressure rod 6 to protect the pressure rod 6 against the upward striking of water and to prevent from the entering of water into the upper cap 1. Because the pressure rod 6 is turned to rotate upward or downward, the friction force between the pressure rod 6 and the upper and lower circles 691 and 692 does not obstruct the up stroke or down stroke of the pressure rod 6.

Please refer to FIGS. 2 and 6 again. The ring-shaped rubber water seal 83 has a plurality of circular grooves 84 on its bottom surface which secure a water tight connection of the bottom surface of the rubber water seal 83 with the upper surface of the projecting collar of the valve element 7 to protects from leakage of water therethrough.

Please refer to FIGS. 6 and 7 again. The cap-like bottom end 75 of the valve element 7 is specially engineered according to fluid dynamics. When the valve element 7 is firmly positioned to tightly seal the water inlet 51, water pressure is confined to act on the bottom center of the valve element 7. When the valve element 7 deviates from its position (as shown in FIG. 6), the applied force from water pressure on the valve element 7 is changed accordingly. By means of the design of the circular surface of the cap-like bottom end 75, the resistance force from water pressure can be minimized so that the handle 2 can be more conveniently operated.

In conclusion, the obliquely leftward or rightward moving range of the handle 2 determines the spirally upward or downward moving range of the pressure rod to directly control the angle of deviation of the valve element 2 so as to further control the quantity of water which flows out.

I claim:
1. A water tap, including:
a upper cap having internally a hollow cylinder and comprising an oblique track piercing through its wall surface;
a socket mounted on said upper cap and comprising a trough-hole on its wall surface;
a pressure rod comprising a projecting collar which defines therewith a circular upper end and a lower portion, said upper end being received in said hollow cylinder of said upper cap, said lower portion having a cone shaped bottom end;
a handle comprising a round rod which extends from the bottom end thereof, said round rod being inserted from said through-hole of said socket into said oblique track of said upper cap and firmly secured to said pressure rod;
a cylindrical body firmly secured to said upper cap at its bottom and comprising therein an upper circular recess hole for the setting therein of a rubber seal ring and a plastic washer, a lower circular recess hole for the insertion therein of said lower portion of said pressure rod, and having an unitary water discharging pipe extending outwardly therefrom for the discharging of water;
a valve seat having generally a hollow body comprising internally a division board defining therewith an upper circular recess and a lower circular recess;
a valve element comprising a pillar having a top slant face, a projecting collar, and a cap-like bottom end having a circular groove thereon for the connection thereto of a conical spring, said pillar having a rubber water seal mounted thereon, said rubber water seal having its bottom surface tightly in contact with the upper surface of the projecting collar of said valve element and its upper surface tightly in contact with the bottom surface of said division board of said valve seat said conical spring and said cap-like bottom end being set in said upper trough of said base to releasably seal said water inlet;
a metal ring set in said lower circular recess of said valve seat for receiving said valve element, said metal ring being designed in such a size that its outer wall surface can be firmly in contact with the inner wall surface of said lower circular recess of said valve seat when it is set therein; and
a base comprising therein an upper trough for the setting therein of a rubber washer and said valve seat, and a water inlet communicating with said upper trough;
wherein the moving of said handle in said oblique track determines the spirally upward or downward moving range of said pressure rod as said cone shaped end abuts against said slant face to directly control the tilting angle of deviation of the valve element so as to further control the quantity of water which flows out of said water discharging pipe.

2. A water tap according to claim 1, wherein the round rod of said handle has a bolt hole vertically penetrating therethrough.

3. A water tap according to claim 1, wherein the projection collar of said pressure rod comprises a transverse hole on its side-wall portion communicating with a vertical hole on its bottom surface, and wherein a screw is inserted in said vertical hole to screw up with the bolt hole of said round rod of said handle so as to secure said handle to said pressure rod when the round rod of said handle is inserted in said transverse hole.

4. A water tap according to claim 1, wherein the plastic washer which is received in the upper circular recess hole of said cylindrical body comprises a circular bottom projection having an outer diameter equal to the inner diameter of the upper circular recess hole of said cylindrical body and slightly smaller than the outer diameter of the plastic washer itself, so that it can be squeezed, when said upper cap tightly screws up with said cylindrical body, to firmly position in between said cylindrical body and said upper cap and to firmly retain said rubber seal ring in the upper circular recess hole of said cylindrical body.

5. A water tap according to claim 1 wherein said rubber seal ring has a center hole which forms a curved opening defining with the body of said rubber seal ring an upper circle and a bottom circle respectively in contact with the outer wall surface of the lower portion of said pressure rod.

6. A water tap according to claim 1, wherein the top slant face of the pillar of said valve element defines an angle of inclination equal to the cone of the bottom end of said pressure rod, and the cap-like bottom end of said valve element has a circular surface which minimizes the striking force of water pressure on said valve element.

7. A water tap according to claim 1, wherein the rubber water seal which is set between said valve seat and said valve element comprises a plurality of circular grooves on its bottom surface.

8. A water tap according to claim 4, wherein said rubber seal ring has a center hole which forms a curved opening defining with the body of said rubber seal ring an upper circle and a bottom circle respectively in contact with the outer wall surface of the lower portion of said pressure rod.

* * * * *